J. W. RICKER.
Animal Tethers.
No. 218,452.  Patented Aug. 12, 1879.
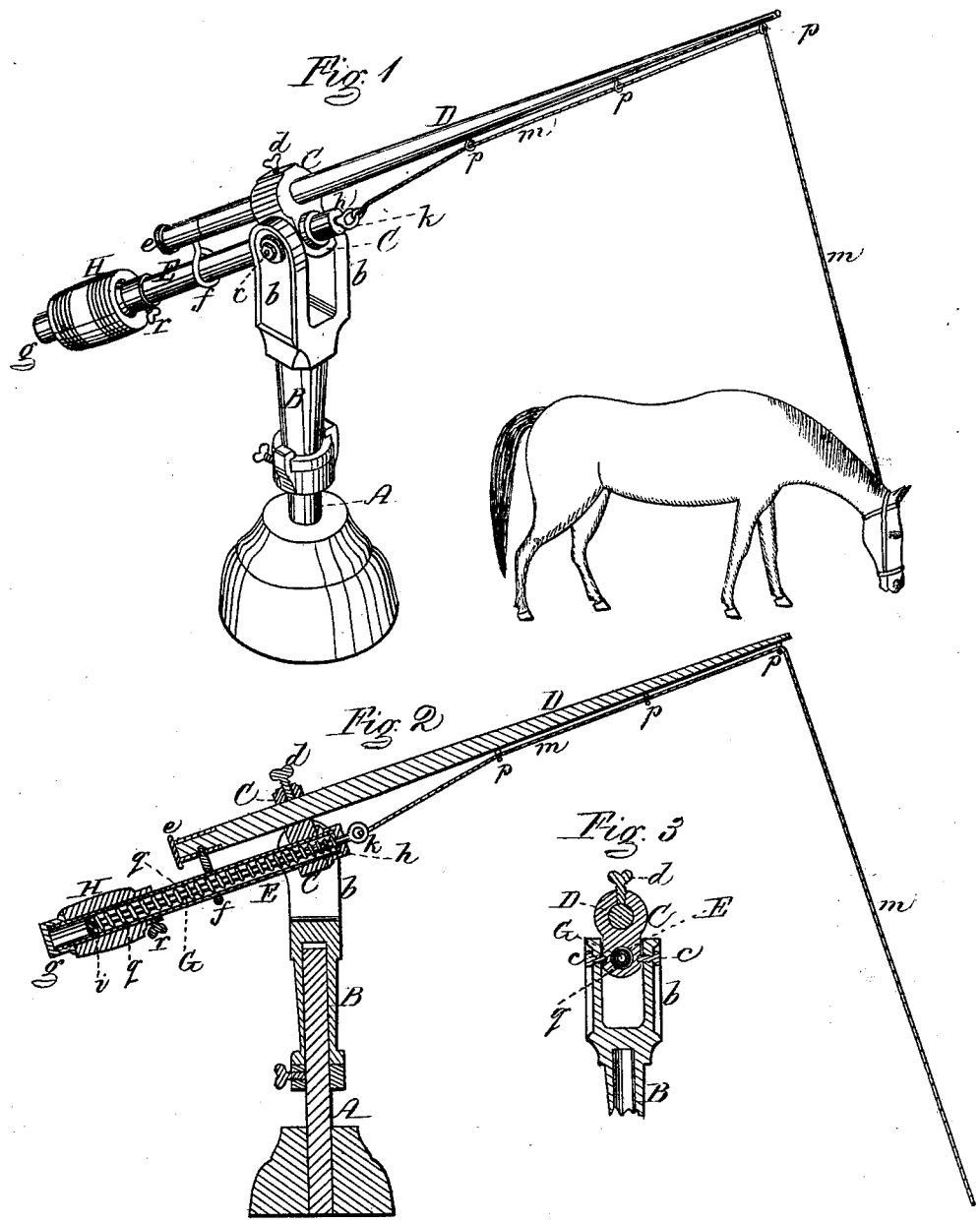

UNITED STATES PATENT OFFICE.

JOHN W. RICKER, OF CHELSEA, MASSACHUSETTS.

IMPROVEMENT IN ANIMAL-TETHERS.

Specification forming part of Letters Patent No. 218,452, dated August 12, 1879; application filed March 10, 1879.

*To all whom it may concern:*

Be it known that I, JOHN W. RICKER, of Chelsea, in the county of Suffolk and State of Massachusetts, have invented certain Improvements in Animal-Tethers, of which the following is a full, clear, and exact description, reference being had to the accompanying drawings, making part of this specification, in which—

Figure 1 is a perspective view of an animal-tether constructed in accordance with my invention. Fig. 2 is a longitudinal vertical section through the center of the same. Fig. 3 is a transverse section through the same.

My invention relates to that class of animal-tethers in which the tether-rope or hitching-cord is connected with a weighted pole pivoted to and swiveling on a post or stake, whereby the rope is at all times kept taut, and thereby prevented from becoming entangled.

In tethers of this description as heretofore constructed, the hitching-cord has been attached directly to the outer end of the weighted pole, which, consequently, required to be made large and heavy to resist the strain frequently put upon it, thereby necessitating the employment of a heavy balance-weight at the shorter end, which not only increased the cost, but rendered the apparatus unsuitable for small animals, on account of the tension on the tether-rope produced by the weight, which could not be varied. Furthermore, the rope or some other part of the apparatus was liable to be broken by any sudden jerk or movement of the animal.

My invention has for its object to overcome these difficulties; and consists in the combination, with the pivoted pole, of a spring with which the inner end of the tether-cord is connected, the spring yielding to any sudden strain or jerk, thereby avoiding breakage, and also enabling me to use a much lighter pole and balance-weight.

My invention also consists in making the counterpoise or balance weight adjustable in position, in order that the longer arm of the lever or tether-pole may be elevated with more or less force, to increase or diminish the strain or tension on the tether-cord to suit animals of different kinds.

My invention also consists in making the tether-pole adjustable within the support or socket by which it is connected with the head of the post or stake, whereby the effective length of the pole can be varied to give the animal more or less scope for grazing.

To enable others skilled in the art to understand and use my invention, I will proceed to describe the manner in which I have carried it out.

In the said drawings, A represents a post or stake, which is intended to be driven into the ground, and over this stake is fitted, so as to revolve freely thereon, a sleeve or cap, B, which is held in place by any suitable device which will not interfere with its revolution, but will prevent it from being drawn off the stake. The upper end of this sleeve is provided with an enlarged bifurcated head, $b$, within which is pivoted, by means of pins or bolts $c$, a piece or socket, C, the upper portion of which is provided with a circular aperture, through which slides the tether-pole D, which is made tapering, and is secured in any desired position by means of a set-screw, $d$.

The large end of the pole D is provided with a metallic cap or head, $e$, to which is secured an eye, $f$, through which passes one end of a metallic tube, E, the opposite end of this tube being screwed into and through the socket C. At the rear end this tube is provided with a screw-cap, $g$, and at the front end with a screw-cap, $h$, the latter being provided with an aperture, through which slides a rod, G, having at its inner end a collar, $i$, and at its outer end an eye, $k$, to which is attached the tether-cord $m$, which is led through eyes $p$ on the under side of the pole D to its outer end, beyond which it may extend any desired distance. Within the tube E the rod G is surrounded by a spiral spring, $q$, one end of which bears against the collar $i$ and the opposite end against the inside of the cap $h$ when in place, and thus when any strain is brought upon the tether-cord by the animal attached to its outer end the rod will be drawn out against the resistance of the spring, which instantly returns the rod and cord to their original positions when the tension is relaxed; and by this means the liability of the tether-cord or any portion of the apparatus being broken or injured by a sudden jerk or movement of the animal is entirely avoided.

Furthermore, by attaching the tether-cord to a spring device, as shown, instead of directly to the pole, as heretofore, the weight and size of the pole can be materially decreased, as it is merely necessary to make it of sufficient strength to sustain the weight of the cord, as all the strain or resistance of the animal is borne by the spring $q$ and its rod G and casing E, instead of by the pole, as hitherto. By inclosing the spring within a casing, as shown, it forms when compressed as closely as possible a solid stop, which thus prevents it from being broken by any further strain.

H is a sliding balance or counterpoise weight, which is made adjustable on the tube E, and is secured in place when adjusted by the set-screw $r$, the tendency of this weight being to keep the small end of the pole D elevated, so that the slack of the cord $m$ will be taken up as the animal approaches the stake A, and thus prevented from becoming entangled; and it will be seen that by adjusting the position of the weight on the tube E the upward tension on the tether-cord may be varied in accordance with the size or kind of animal attached thereto, whose ease and comfort are thus promoted, this adjustment being also useful in balancing poles of different lengths and sizes.

By sliding the pole D within its support C, and securing it when adjusted by means of the set-screw $d$, its effective length can be readily increased or diminished at pleasure, so as to afford more or less scope or range for grazing, which will be found a great convenience.

Another advantage of my construction is the reduced weight of the counterpoise H, rendered possible by the employment of a lighter tethering-pole, which makes the apparatus easier to handle and transport from place to place, and also reduces the cost, and instead of the weight H being made to slide upon the the tube E, it may be applied to the rear portion or shorter arm of the pole D.

What I claim as my invention, and desire to secure by Letters Patent, is—

1. The combination of the pole D, pivoted to the swiveling head $b$, the tube E, with its spring $q$ and rod G, and the tether-cord $m$, attached to the rod G, all constructed to operate substantially in the manner and for the purpose set forth.

2. The tether-pole D and adjustable sliding weight H, in combination with the journal-socket C, tube E, and post B, substantially as described.

3. In an animal-tether, the tether-pole D, adapted to slide within its pivoted socket or support C, and provided with a set-screw, $d$, whereby it is made adjustable to increase or decrease its length, substantially as set forth.

Witness my hand this 3d day of March, A. D. 1879.

JOHN W. RICKER.

In presence of—
P. E. TESCHEMACHER,
W. J. CAMBRIDGE.